United States Patent Office 3,060,243
Patented Oct. 23, 1962

3,060,243
METHOD FOR PREPARATION OF 2,2-BIS(PARA-ALLYLOXYPHENYL)PROPANE
George E. Ham, Lake Jackson, Tex., assignor to The Dow Chemical Company, Midland, Mich., a corporation of Delaware
No Drawing. Filed Aug. 6, 1959, Ser. No. 831,951
3 Claims. (Cl. 260—613)

This invention relates to a method for the preparation of 2,2-bis(para-allyloxyphenyl)propane. It more particularly relates to an improved method for the production of 2,2-bis(para-allyloxyphenyl)propane by the overall process represented as follows:

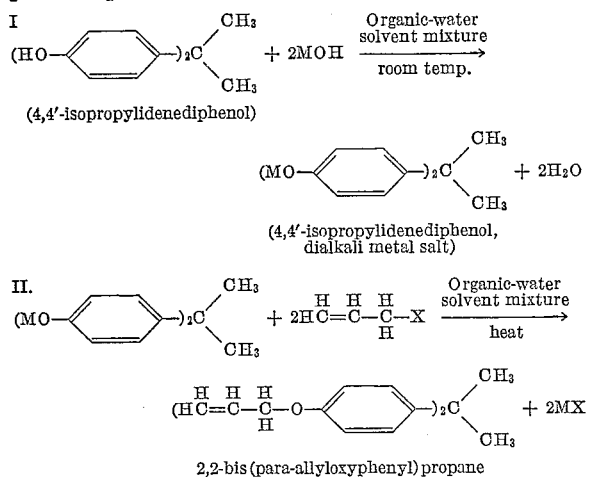

where M is an alkali metal; e.g., lithium, sodium or potassium and X is halogen, e.g., chlorine, bromine or iodine.

2,2-bis(para-allyloxyphenyl)propane previously has been reported (U.S. Patent 2,560,350) to have been prepared by reaction of an allyl halide, such as allyl chloride or allyl bromide, with 4,4'-isopropylidenediphenol, in an essentially anhydrous medium of ethanol or acetone in the presence of an HCl or BrH acceptor such as anhydrous potassium carbonate. A reaction time, at reflux temperature, of about 9 hours was reported to be necessary to complete the reaction and the product yield reported by this method was only about 49 percent. Furthermore, treatment of the resultant product mixture with an aqueous caustic solution was required to remove unreacted 4,4'-isopropylidenediphenol. This latter treatment resulted in formation of the disodium salt of 4,4'-isopropylidenediphenol, which compound, as well as alkali metal chloride formed during the preparative reaction both were insoluble in the reaction mixture and gave an undesirable solid-liquid mixture from which the product had to be recovered and purified.

It is the principal object of this invention to provide a new and useful process for the preparation of 2,2-bis-(para-allyloxyphenyl)propane in high yields. An advantage of this process is that relatively short reaction times are involved. A further advantage is that the product reaction mixture contains no undesirable solid impurities or reaction byproducts. A further advantage is that the desired product can be separated easily from the reaction mixture. Still another advantage is that it is not necessary to maintain anhydrous reaction conditions. A further advantage of the process is that this method easily is adapted to continuous processing. Still other objects and advantages will become apparent from the method description presented hereinafter.

The process of this invention includes the reaction of an alkali metal hydroxide, 4,4'-isopropylidenediphenol and an allyl halide in a reaction solvent system composed of a water soluble organic compound—water binary mixture to prepare 2,2-bis(para-allyloxyphenyl)propane.

To carry out the method of the invention, an alkali metal hydroxide such as sodium hydroxide and 4,4'-isopropylidenediphenol, in about a molar ratio of 2 moles of the hydroxide per mole of the organic compound, are dissolved in a mixture of water and a water-soluble organic compound in which the disodium salt of 4,4'-isopropylidenediphenol and sodium halide are soluble, but in which solvent mixture the 2,2-bis(para-allyloxyphenyl)propane product is insoluble when said solvent mixture contains such dissolved sodium halide. Water-soluble liquid organic compounds which are inert to the reactants and reaction product and therefore suitable for use as solvent members in this process include: ethanol, tetrahydrofuran, acetonitrile, acetone, para-dioxane, and the like. Binary organic-water solvent mixtures over the range from about 20 to about 80 percent water by volume are operable although solvent mixtures containing from about 30 to about 70 percent water by volume are desired and mixtures containing about 50 percent by volume each of water and water soluble organic compound are preferred. The concentration of the sodium hydroxide and 4,4'-isopropylidenediphenol to be used with the solvent mixtures is not a determining factor at conventional levels, and is limited only by the solubility of these reactants in the solvent systems. To the solution of sodium hydroxide and 4,4'-isopropylidenediphenol, there is added at least 2 mols of an allyl halide, such as allyl chloride, per mole of the 4,4'-isopropylidenediphenol present and this resulting mixture is heated at about atmosphere pressure, at temperatures from about 40 to about 100° centigrade with continuous agitation from about 3 up to about 18 hours. Operable reaction temperatures at normal pressures, are from about 40° to about 100° centigrade; a desired reaction temperature range is from about 50° to about 100° centigrade and the preferred reaction temperature is about the reflux temperature of the reaction mixture; i.e., from about 55° to about 70° centigrade. Although the reaction normally is carried out at about atmospheric pressures, elevated pressures can be employed. In this latter case, reaction temperatures as high as about 150° centigrade can be used.

During the reaction period, the product, dissolved in the organic solvent member, separates as an oil-like layer, which, after the completion of the reaction easily is separated from the aqueous portion of the reaction mixture, this oil-like solution dried over a dehydrating agent such as anhydrous sodium sulfate, and the solvent then removed by distillation to yield 2,2-bis(para-allyloxyphenyl)propane in high yields.

Alternatively to use of this procedure, the alkali metal hydroxide and the 4,4'-isopropylidenediphenol can be dissolved separately in the water and the organic solvent respectively, and these two solutions then mixed, the allyl halide added to this mixture, and the reaction carried out as described above.

The following examples will serve further to illustrate the invention.

*Example 1*

Sodium hydroxide (42 grams, 1.05 moles) was dissolved in 400 milliliters of water and mixed with a solution of 114 grams (0.50 mole) of 4,4,-isopropylidenediphenol in 400 milliliters of ethanol. Allyl chloride (115 grams, 1.50 moles) was added to this solution and the resulting mixture heated under reflux for about 3 hours. As the reaction proceeded, an oily layer separated from the reaction mixture. After the three hour reaction period, this oily layer was removed from the reaction mixture, 100 milliliters of ether added to the separated oil, and the resulting solution dried over anhydrous sodium sulfate. The volatile solvents then were removed under vacuum from the dried solution to yield the product, 2,2-bis(para-allyloxyphenyl)propane, as a light-yellow, clear liquid which weighed 138 grams and represented a yield of 89.6 percent.

*Example 2*

In the same manner and procedure and using the same amount of reactants as in Example 1, the reflux was carried out for 18 hours to yield the desired light-yellow, clear liquid 2,2-bis(para-allyloxyphenyl)propane as before.

*Example 3*

Sodium hydroxide (10.5 grams, 0.262 mole) was dissolved in 100 milliliters of water and mixed with a solution og 28.5 grams (0.125 mole) 4,4'-isopropylidenediphenol in 100 milliliters of para-dioxane. Allyl chloride (28.8 grams, 0.375 mole) was added to this solution and the mixture heated and stirred under reflux for about 3 hours. The product, dissolved in the organic solvent, was separated from the reaction mixture at the end of the three hours, and the volatile solvent removed under vacuum. The clear, light-yellow liquid 2,2-bis(para-allyloxyphenyl)propane as shown by comparison of infrared spectrum to be 98 percent pure represented a yield of about 90 percent of theoretical.

*Example 4*

The exact same procedure as described in Example 3 was used, except acetonitrile was utilized as the organic member of the solvent mixture. The 2,2-bis(para-allyloxyphenyl)propane was obtained in about 89 percent of theoretical yield.

*Example 5*

The exact same procedure and conditions as described in Example 3 were used except acetone was used as the organic member of the solvent mixture. The product 2,2-bis(para-allyloxyphenyl)propane here was recovered in a yield of about 85 percent of theoretical.

*Example 6*

The exact same procedure and conditions as described in Example 3 were used except tetrahydrofuran served as the organic member of the solvent. The 2,2-bis(para-allyloxyphenyl)propane product here was obtained in a yield of about 78 percent of theoretical.

*Example 7*

Sodium hydroxide (10.5 grams, 0.262 mole) and 4,4'-isopropylidenediphenol (28.5 grams, 0.125 mole) were dissolved in 200 milliliters of a mixed solvent composed of about 30 percent by volume water and 70 percent by volume ethanol. Allyl chloride (28.8 grams, 0.375 mole) was added and the mixture then reacted as in Example 3. Twenty-five grams of 2,2-bis(para-allyloxyphenyl)propane were obtained, which represented a yield of about 65 percent of theoretical.

*Example 8*

The exact same procedure and conditions were used as described in Example 7 except for the use of a solvent mixture composed of about 40 percent water and about 60 percent ethanol by volume. The yield of 2,2-bis(para-allyloxyphenyl)propane obtained was about 62 percent of theoretical.

*Example 9*

The procedure and conditions described in Example 7 were followed except for use of a solvent mixture which was about 60 percent water and about 40 percent ethanol by volume. The yield of the 2,2-bis(para-allyloxyphenyl)propane in this reaction mixture was about 74 percent of theoretical.

*Example 10*

The same procedure and conditions as described in Example 7 were used except the solvent mixture was composed of about 70 percent water and about 30 percent ethanol by volume. The yield of 2,2-bis(para-allyloxyphenyl)propane was about 54 percent of theoretical.

*Example 11*

Use of the same procedure and conditions as described in Example 7, except that the solvent mixture be composed of about 20 percent water and about 80 percent ethanol by volume, can yield the desired 2,2-bis(para-allyloxyphenyl)propane.

*Example 12*

Use of the same procedure and conditions as described in Example 7, except that the solvent mixture be composed of 80 percent water and about 20 percent ethanol by volume, can result in production of the desired 2,2-bis(paraallyloxyphenyl)propane.

In a manner similar to the foregoing, potassium hydroxide and allyl bromide-, lithium hydroxide and allyl chloride-, sodium hydroxide and allyl iodide-, lithium hydroxide and allyl bromide-, and potassium hydroxide and allyl iodide can be reacted with 4,4'-isopropylidenediphenol in the presence of a suitable aqueous-organic solvent system to yield the 2,2-bis(para-allyloxyphenyl) propane.

Various modifications can be made in this invention without departing from the spirit or scope thereof for it is understood that I limit myself only as defined in the appended claims.

I claim:

1. In a process for the preparation of 2,2-bis(para-allyloxyphenyl)propane wherein on a molar basis at least 2 moles each of an alkali metal hydroxide and an allyl halide are reacted with a molar quantity of 4,4'-isopropylidenediphenol at a temperature of from about 40 to about 100° C. for a reaction time of from about 3 to about 18 hours and 2,2-bis(para-allyloxyphenyl)propane is recovered therefrom, the improvement which consists of conducting the reaction in a reaction medium consisting essentially of a mixture containing from about 20 to about 80 percent water by volume and from about 80 to about 20 percent by volume of an organic solvent selected from the group consisting of ethanol, tetrahydrofuran, acetonitrile, acetone and para-dioxane.

2. In a process for the preparation of 2,2-bis(para-allyloxyphenyl)propane wherein on a molar basis at at about 2 molar quantities each of sodium hydroxide and allyl chloride are reacted with a molar quantity of 4,4'-isopropylidenediphenol at about reflux temperature for a reaction time of from about 3 to about 18 hours and 2,2-bis(para-allyloxyphenyl)propane is recovered therefrom, the improvement which consists of conducting the reaction in an acetone-water mixture containing about 50 percent each of water and acetone by volume.

3. In a process for the preparation of 2,2-bis(para-allyloxyphenyl)propane wherein on a molar basis about 2 molar quantities each of sodium hydroxide and allyl chloride are reacted with a molar quantity of 4,4'-isopropylidenediphenol at about reflux temperature and for about 3 hours reaction time and the resulting 2,2-bis(para-allyloxphenyl)propane product is separated therefrom, the improvement which consists of carrying out the reaction in a medium consisting essentially of a mixture containing from about 30 to about 70 percent water by volume and from about 70 to about 30 percent by volume of a member selected from the group consisting of ethanol, tetrahydrofuran, acetonitrile, acetone and para-dioxane.

References Cited in the file of this patent

UNITED STATES PATENTS

| | | |
|---|---|---|
| 2,560,350 | Jelinek | July 10, 1951 |
| 2,856,435 | Lo | Oct. 14, 1958 |
| 2,943,095 | Farnham et al. | June 28, 1960 |

OTHER REFERENCES

Fieser et al.: Organic Chemistry, 3rd ed. (1956), page 136. (Copy in Library.)